H. GROTZKY.
WEED CUTTER.
APPLICATION FILED AUG. 5, 1915.
1,166,831.
Patented Jan. 4, 1916.
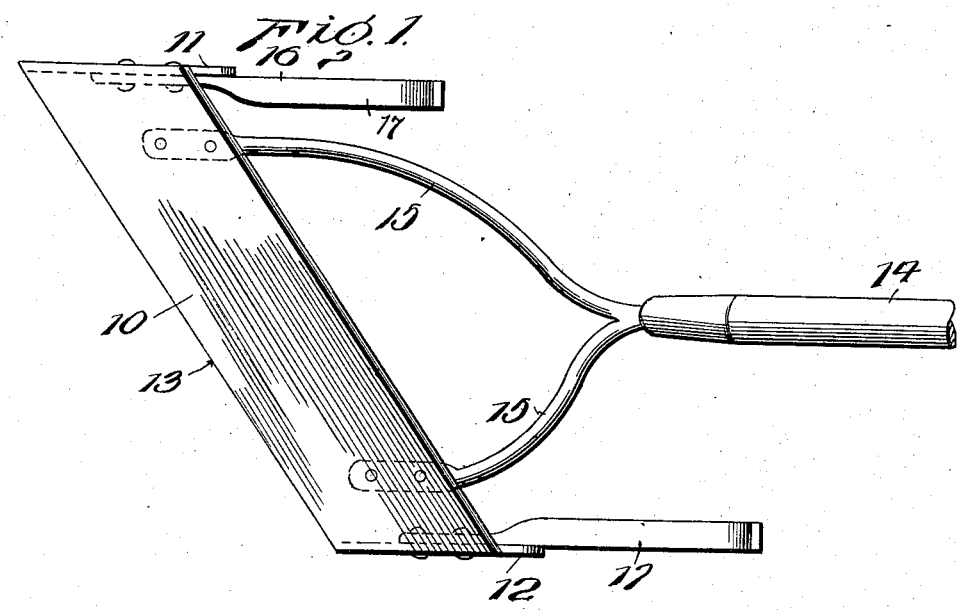
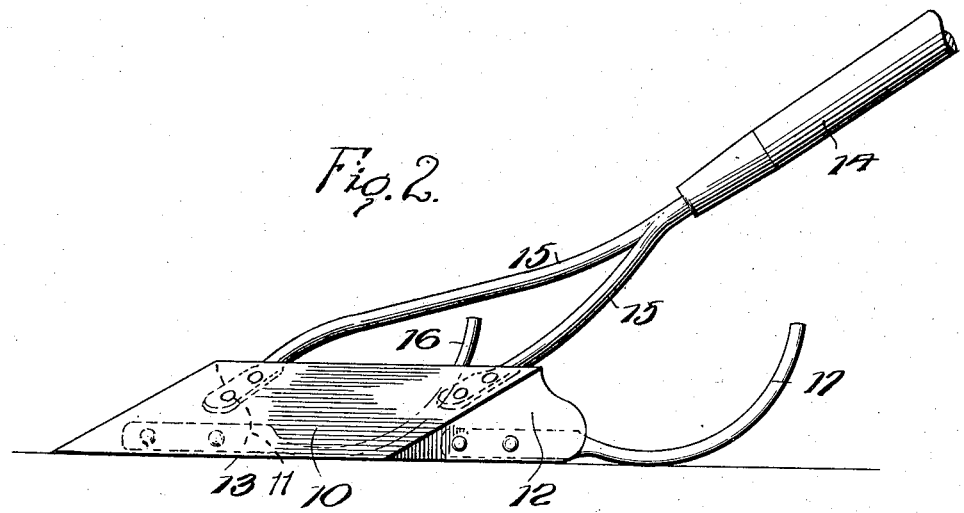
Inventor
Hugo Grotzky
By
Attorneys

UNITED STATES PATENT OFFICE.

HUGO GROTZKY, OF CHAPMAN, NEBRASKA.

WEED-CUTTER.

1,166,831. Specification of Letters Patent. Patented Jan. 4, 1916.

Application filed August 5, 1915. Serial No. 43,816.

*To all whom it may concern:*

Be it known that I, HUGO GROTZKY, a citizen of the United States, residing at Chapman, in the county of Merrick and State of Nebraska, have invented certain new and useful Improvements in Weed-Cutters, of which the following is a specification.

This invention relates to improvements in weeding devices, and has for one of its objects to provide a simply constructed device which may be employed for removing weeds from around plants and which is readily adjusted to operate close to the top of the soil or beneath the surface of the soil to any required extent.

With these and other objects in view, the invention consists in certain novel features of construction as hereinafter shown and described and then specifically pointed out in the claims; and in the drawings illustrative of the preferred embodiment of the invention:—Figure 1 is a plan view of the improved implement. Fig. 2 is a side elevation of the same.

Corresponding and like parts are referred to in the following description and indicated in all the views of the accompanying drawings by the same reference characters.

The improved implement comprises a hoe-like member, represented as a whole at 10, and with downturned terminals 11—12. The terminals are disposed in parallel relation while the body portion of the hoe extends obliquely to the longitudinal plane of the terminals 11—12, so that the cutting edge, indicated at 13, of the hoe operates obliquely when passing over or through the ground. A handle 14 is connected to the body portion 10 of the hoe by curved members 15 and preferably extends rearwardly and upwardly in convenient position for the operator. Connected to the downwardly directed terminal 11 of the hoe portion of the device is a curved arm 16, while a similarly curved arm 17 is connected to the downwardly directed terminal 12 of the hoe. The members 16—17 extend rearwardly of the body portion 10 of the hoe and, when the hoe is moving beneath the surface of the ground or over the surface of the ground, the arms have no function and do not interfere with the ordinary operation of the hoe, but if it is desired to elevate the cutting edge of the hoe, the handle 14 is depressed to cause the members 16—17 to rock or roll upon the ground and thus correspondingly elevate the cutting edge of the hoe and cause the latter to operate at any distance below the ground or to sever the growth at any required distance above the ground. The improved implement will be found very convenient for use in gardens or in soft ground.

Having thus described my invention, what I claim as new is:

1. An implement of the class described comprising a body extending obliquely to the line of travel and having a rearwardly and upwardly inclined upper face and depending ends, said ends being directed in parallel relation and with their lower edges oblique to the inclined face of the body, and bearing arms connected to said depending ends and extending rearwardly of said body.

2. An implement of the class described comprising a blade having downturned ends, an operating handle, and arms connected to said downturned ends and extending rearwardly of the blade.

In testimony whereof I affix my signature in presence of two witnesses.

HUGO GROTZKY. [L. S.]

Witnesses:
CHAS. G. RYAN,
M. GUY BRITT.

Copies of this patent may be obtained for five cents each, by addressing the "Commissioner of Patents, Washington, D. C."